(12) United States Patent
Jamet

(10) Patent No.: US 6,334,015 B2
(45) Date of Patent: Dec. 25, 2001

(54) CABLE WITH OPTICAL FIBERS RETAINED IN A SHEATH

(75) Inventor: Patrick Jamet, Marolles sur Seine (FR)

(73) Assignee: Sagem SA, Paris (FR)

( * ) Notice: Subject to any disclaimer, the term of this patent is extended or adjusted under 35 U.S.C. 154(b) by 0 days.

(21) Appl. No.: 09/848,435

(22) Filed: May 4, 2001

Related U.S. Application Data

(63) Continuation of application No. PCT/FR99/02609, filed on Oct. 26, 1999.

Foreign Application Priority Data

Nov. 18, 1998 (FR) .................................................. 98-14519

(51) Int. Cl.$^7$ ...................................................... G02B 6/44
(52) U.S. Cl. .............................. 385/102; 385/100; 385/109
(58) Field of Search ..................................... 385/100, 102, 385/106, 109, 112

(56) References Cited

U.S. PATENT DOCUMENTS

| | | | |
|---|---|---|---|
| 5,751,880 | * | 5/1998 | Gaillard ................................ 385/109 |
| 5,761,362 | * | 6/1998 | Yang et al. ........................... 385/109 |
| 6,035,087 | * | 3/2000 | Bonicel et al. ...................... 385/109 |

FOREIGN PATENT DOCUMENTS

| | | |
|---|---|---|
| 60257414 | 12/1985 | (EP) . |
| 62047008 | 2/1987 | (EP) . |
| 0 353 555 A2 | 2/1990 | (EP) . |
| 0 468 878 A1 | 1/1992 | (EP) . |
| 2 760 540 A | 9/1998 | (FR) . |

\* cited by examiner

Primary Examiner—John D. Lee
Assistant Examiner—Sarah U Song
(74) Attorney, Agent, or Firm—Lawrence & Laubscher

(57) ABSTRACT

In order to prevent microcurvatures in the optical fibers when the cable is subjected to temperature variations in the range from approximately $-40°$ C. to approximately $+85°$ C., a cable with N optical fibers (FO) each having a core (1) and a coating (2) with coefficients of thermal expansion/compression $\alpha 1$ and $\alpha 2$, Young's modulus in traction E1 and E2 and sections S1 and S2 comprises a retaining sheath (3) enveloping the optical fibers buried in a filling material (4) having a coefficient of thermal expansion/compression $\alpha 4$, Young's modulus in traction E4 and section S4. The sheath (3) satisfies the condition:

$(\alpha 3.E3.S3) \leq [(\alpha 1.E1.S1)+(\alpha 2.E2.S2)](N/14)+(\alpha 4.E.4.S4)$ in which $\alpha 3$, E3 and S3 are respectively the coefficient of thermal expansion/compression, the Young's modulus in traction and the section of the sheath.

6 Claims, 1 Drawing Sheet

CABLE WITH OPTICAL FIBERS RETAINED IN A SHEATH

REFERENCE TO RELATED APPLICATION

This application is a continuation application of the PCT Application No. PCT/FR99/02609 filed on Oct. 26, 1999, which in turn is based on the French Priority Application No. 98-14519.

BACKGROUND OF THE INVENTION

1. Field of the Invention

The present invention relates to a telecommunication cable having optical fibers contained in a retaining sheath. The cable is intended in particular for transmitting telephone and/or data signals at high bit rates, for example in local area networks, or for use as a trunk cable between telephone central offices, or as a distribution or branch connection cable for user lines that can convey telephone, data and/or picture signals.

2. Description of the Prior Art

European patent application No. 0,468,878 discloses a telecommunication cable including plural optical fibers surrounded by a retaining sheath with low thickness that is easy to tear. The retaining sheath is in contact with the optical fibers to grip them tightly. The space between the fibers inside the sheath can be filled with a sealing product.

The same retaining sheath disposed directly, without decoupling, over the assembly of fibers does not degrade their transmission properties. The sheath assures cohesion of the fibers to form a highly compact module, nevertheless enabling fast stripping in situ at the time of making a connection to a load unit or a splice between cables.

The optical fibers are therefore protected from contact with the surrounding environment. Because the thickness of the retaining sheath is low, the optical fibers are not subjected to stretching and compression stresses during thermal cycles, which makes manufacture of the sheath economical, especially if the sheath is manufactured during the same fabrication operation as drawing the optical fibers constituting the module, using an in-line multiple fiber drawing/cable assembly technique.

The module obtained in this way is highly compact and facilitates connecting the cable by simple identification, easy stripping, easy handling and flexibility, which is very favorable in terms of the internal organization of splicing boxes, which can therefore be optimized in terms of size and cost.

French patent application No. 2,760,540 also concerns a cable including a plurality of optical fibers tightly gripped in a sheath such as a microtube mounted very close to the optical fibers. This patent application gives rise to the problem of increased attenuation due to microcurvatures of the optical fibers confined in the sheath if the sheath is deformed by external mechanical or thermal stresses.

To prevent microcurvature of the optical fibers tightly gripped inside the sheath, whilst retaining a sheath that is easy to cut with no risk of damaging the optical fibers tightly gripped inside the sheath, patent application No. 2,760,540 teaches that the sheath should have a Young's modulus less than 200 MPa and a Shore hardness less than 90 at a temperature of approximately +20° C. and a Young's modulus less than 2000 MPa at a temperature of approximately −40° C. However, the above parameters are not defined: the Young's modulus could be the Young's modulus in tension or the Young's modulus in flexion, which differ by approximately 20% in the case of thermoplastics polymers, and the hardness could be the Shore A hardness or the Shore D hardness.

OBJECT OF THE INVENTION

An object of the present invention is to provide an optical fiber cable including a retaining sheath having mechanical characteristics defined with respect of those of the optical fibers, in particular to prevent microcurvatures in the optical fibers when the cable is subjected to temperature variations in the range from approximately −40° C. to approximately +85° C.

SUMMARY OF THE INVENTION

Accordingly, a cable comprising N optical fibers each having a core with a coefficient of thermal expansion/compression $\alpha 1$, a Young's modulus in traction $E1$ and a section $S1$ and a coating with a coefficient of thermal expansion/compression $\alpha 2$, a Young's modulus in traction $E2$ and a section $S2$, a retaining sheath enveloping the optical fibers, and a filling material between the optical fibers and the retaining sheath having a coefficient of thermal expansion/compression $\alpha 4$, a Young's modulus in traction $E4$ and a section $S4$, is characterized in that the retaining sheath has a coefficient of thermal expansion/compression $\alpha 3$, a Young's modulus in traction $E3$ and a section $S3$ satisfying the following condition: $(\alpha 3.E3.S3) \leq [(\alpha 1.E1.S1)+(\alpha 2.E2.S2)](N/14)+(\alpha 4.E4.S4)$.

The product $\alpha 3 \times E3$ is for the usual optical fiber cables less than $0.6 \times 10^{-3}$ MPa/° C. (or $0.6 \times 10^{-4}$ daN/mm²/° C.).

The material of the retaining sheath is preferably an amorphous thermoplastics or elastomer material, which can contain mineral charges.

The flexibility and easy tearing required of the sheath are obtained for the aforementioned materials when the retaining sheath has a thickness less than 0.3 mm and a Shore D hardness less than 45. In particular, a retaining sheath section with respect to an individual fiber of the order of 0.053 mm² per optical fiber represents a very good compromise in the case of optical fibers with a core diameter of 0.125 mm and a coating diameter of 0.250 mm.

BRIEF DESCRIPTION OF THE DRAWINGS

Other features and advantages of the present invention will become more clearly apparent on reading the following description of preferred embodiments of the invention, which description is given with reference to the corresponding accompanying drawings, in which.

DESCRIPTION OF THE PREFERRED EMBODIMENTS

Figure 1:
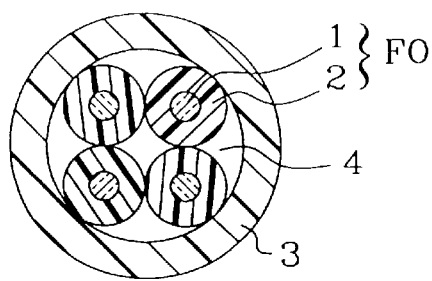
FIGS. 1 to 4 are large-scale sectional views of optical fiber telecommunication cables according to the invention.
Figure 2:
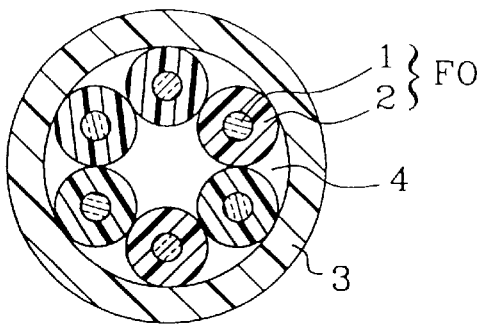
Figure 3:
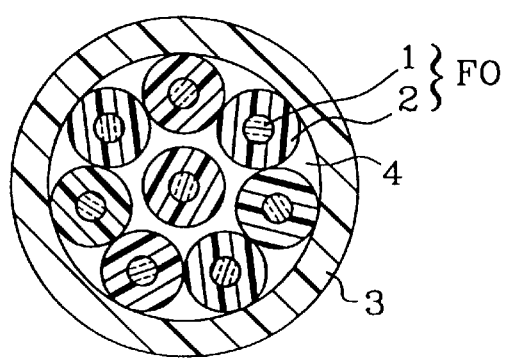
Figure 4:
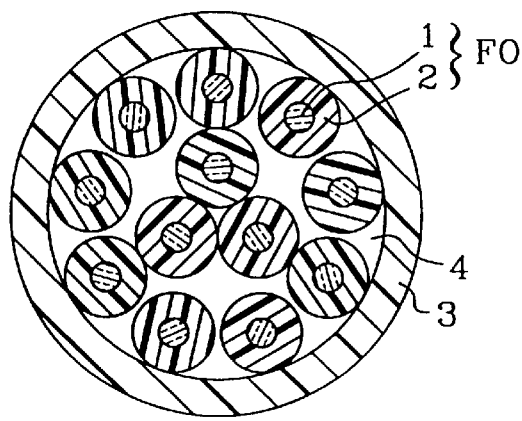

Each of the telecommunication cables according to the invention shown in FIGS. 1 to 4 comprises a plurality of optical fibers FO. Each optical fiber FO has a silica core 1 which typically has a section S1 with a diameter of 0.125 mm, and a colored identifying coating 2 which has a section S2 with a thickness of 0.062 mm, so that the diameter of the optical fiber FO is approximately 0.25 mm. The coefficient of thermal expansion/contraction $\alpha 1$ of the core of the optical fiber 1 is typically equal to $0.4 \times 10^{-6}$ mm/mm/° C. and the Young's modulus in traction $E1$ of the core of the optical fiber 1 is typically equal to $7 \times 10^4$ MPa; the coefficient of thermal expansion/contraction $\alpha 2$ of the optical fiber coating 2 is equal to $60 \times 10^{-6}$ mm/mm/° C. and the Young's modulus in traction $E2$ of the optical fiber coating 2 is equal to $10^2$ MPa.

A thin, easily torn and generally cylindrical retaining sheath 3 envelops the optical fibers FO. The retaining sheath 3 tightly grips a predetermined number N of optical fibers FO, for example four, six, eight or twelve fibers in the embodiments illustrated in FIGS. 1 to 4, to hold the optical fibers in a group and thereby constitute a compact module. Most of the optical fibers at the outside periphery of the module are in contact with the sheath 3. The retaining sheath 3, referred to as a "microsheath", is extruded into a thermoplastics material defined hereinafter. As explained later, the retaining sheath 3 is very thin and has a thickness of the order of one tenth of a millimeter. The outside diameter of the retaining sheath is of the order of one millimeter.

The interior of the retaining sheath is filled with a filler material 4, such as silicone oil or gel, with which the optical fibers are coated prior to passing them through a die for extruding the retaining sheath. The filling material 4 seals the interior of the sheath longitudinally. The coefficient of thermal expansion/contraction and the Young's modulus in traction of the filling material 4 are respectively denoted by $\alpha 4$ and E4 and expressed in mm/mm/° C. and MPa. S4 denotes the section of the filling material, i.e. the surface area of the interior cross-section of the sheath 3, excluding the sections of the optical fibers FO.

To distinguish it from other retaining sheaths the retaining sheath 3 can be coated with one or more colored identifying films or be self-colored. Thus a plurality of optical fiber modules, like that shown in FIGS. 1 to 4, can be combined within a protective jacket of a telecommunication cable, as shown in the aforementioned European patent application No. 0,468,878, or can be retained in a cylindrical sheath to form a bundle of several modules, with or without a central reinforcing member, which bundle is combined with other bundles of modules in a protective jacket of a telecommunication cable.

The thermoplastics material constituting the retaining sheath 3 does not degrade the transmission performances and the service life of the optical fibers FO. The invention does not subject the optical fibers to any microcurvatures, in particular if the module is subject to temperature variations, in particular at low temperatures. It is recalled that an optical fiber is subjected to microcurvatures when it is shaped as a sinusoid with a short pitch, which reduces the optical performances of the optical fiber and in particular increases its attenuation. In accordance with the invention, if the retaining sheath 3 contracts when cold, it does not entrain the optical fibers FO with it and, conversely, the group of optical fibers contained in the sheath "banks up" the shrinkage of the sheath to prevent the optical fibers from being subjected to microcurvatures.

The stated performances of the telecommunication cable according to the invention are obtained by selecting the coefficient of thermal expansion/contraction $\alpha 3$, expressed in mm/mm/° C., the Young's modulus in traction E3, also referred to as the modulus or stress of elasticity in traction, expressed in MPa, and the section S3 between the inside and outside peripheries of the retaining sheath 3 expressed in $mm^2$.

To obtain these performances, variations in attenuation were measured as a function of temperature, for example in the range from −40° C. to +85° C., for groups of different numbers of optical fibers enveloped in retaining sheaths of different kinds and with different dimensions. The performances are deemed to be achieved if, for the aforementioned range of temperature variation, the variation in the attenuation at a wavelength of 1550 nm, for single-mode optical fibers for example, does not exceed 0.05 dB/km and is totally reversible.

The measurements showed that the following condition must be satisfied to obtain the target performances in the range from approximately −40° C. to approximately +85° C. for a sheath 3 containing N optical fibers FO: $(\alpha 3.E3.S3) \leq [(\alpha 1.E1.S1)+(\alpha 2.E2.S2)](N/14)+(\alpha 4.E4.S4)$.

The Young's modulus in traction E4 of the filling material is very often very much less than 1 MPa, and so the above condition can be written:

$(\alpha 3.E3.S3) \leq [(\alpha 1.E1.S1)+(\alpha 2.E2.S2)](N/14)$.

The coefficient of thermal expansion/contraction $\alpha 3$ of the retaining sheath 3 for below appropriate sheath materials lies typically in the range from $60 \times 10^{-6}$ to $200 \times 10^{-6}$ mm/mm/° C. Numerical application to the optical fiber cables described previously gives the following results for the maximum product $(\alpha 3 \times E3)$:

| Number of optical fibers | 4 | 6 | 8 | 12 |
|---|---|---|---|---|
| Sheath outside diameter in mm | 0.85 | 1.00 | 1.10 | 1.30 |
| Sheath thickness in mm | 0.115 | 0.116 | 0.127 | 0.148 |
| maxi ($\alpha 3 \times E3$) in $10^{-3}$ MPa/° C. ($\cong 10^{-4}$ daN/mm²/° C. | 0.605 | 0.755 | 0.830 | 0.910 |

In all cases, a retaining sheath whose Young's modulus in traction E3 and coefficient of thermal expansion/contraction $\alpha 3$ are low and for which the maximum product $(\alpha 3 \times E3)$ is less than $0.6 \times 10^3$ MPa/° C. (or $0.6 \times 10^{-4}$ daN/mm²/° C.) achieves the target performances.

For example, a thermoplastics material having the following characteristics satisfies the following condition:
$\alpha 3 = 60.10^{-6}$ mm/mm/° C., E3=10 MPa,
i.e. $(\alpha 3.E3)=0,6.10^{-3}$ MPa/° C. (or $0,6.10^{-4}$ daN/mm²/° C.).

For the cable to be handled without immediately tearing the retaining sheath, a sheath material with a lower coefficient of thermal expansion/contraction, for example $60 \times 10^{-6}$ mm/mm/° C., and with a slightly higher Young's modulus in traction, for example 1.00 daN/mm²≅10.0 MPa is preferable over a sheath material with a higher coefficient of thermal expansion/contraction, for example $200 \times 10^{-6}$ mm/mm/° C., and a low Young's modulus in traction, for example 0.30 daN/mm²≅3.0 MPa.

The cable according to the invention is flexible and the retaining sheath 3 can easily be torn by hand. The latter conditions imply that the material of the retaining sheath has a Shore D hardness less than 45 and a thickness less than 0.3 mm, preferably in the range from 0.1 to 0.2 mm.

The material of the extruded retaining sheath satisfying the above condition is also selected to minimize post-extrusion shrinkage of the sheath due to relaxation of the stresses generated in the material by stretching it and to prevent any risk of recrystallization of the material causing risks of microcurvatures in the optical fibers. The material of the retaining sheath therefore has no tendency to recrystallize in the working range from −40° C. to +85° C.

For example, the material of the retaining sheath is an amorphous thermoplastics material, for example polyvinylchloride (PVC) or an elastomer; or a charged thermoplastics material, for example polyethylene or a polyolefin such as ethylene vinyl acetate (EVA), containing a sufficient quantity of one or more of the following mineral charges: chalk, kaolin, silica, talc, calcium carbonate, alumina hydrate or magnesium hydrate, titanium oxide.

What I claim is:

1. A cable comprising N optical fibers each having a core with a coefficient of thermal expansion/compression $\alpha 1$, a Young's modulus in traction E1 and a section S1 and a coating with a coefficient of thermal expansion/compression $\alpha 2$, a Young's modulus in traction E2 and a section S2, a retaining sheath enveloping the optical fibers, and a filling material between the optical fibers and the retaining sheath having a coefficient of thermal expansion/compression $\alpha 4$, a Young's modulus E4 in traction and a section S4, said retaining sheath having a coefficient of thermal expansion/compression $\alpha 3$, a Young's modulus in traction E3 and a section S3 satisfying the following condition: $(\alpha 3.E3.S3) \leqq [(\alpha 1.E1.S1)+(\alpha 2.E2.S2)](N/14)+(\alpha 4.E4.S4)$.

2. A cable according to claim 1, wherein the product ($\alpha 3 \times E3$) is less than $0.6 \times 10^{-3}$ MPa/° C.

3. A cable according to claim 1, wherein the material of the retaining sheath is an amorphous thermoplastics or elastomer material.

4. A cable according to claim 3, wherein the material of the retaining sheath contains mineral charges.

5. A cable according to claim 1, wherein the retaining sheath has a thickness less than 0.3 mm.

6. A cable according to claim 1, wherein the retaining sheath has a Shore D hardness less than 45.

* * * * *